United States Patent [19]

Ferguson

[11] 4,106,877

[45] Aug. 15, 1978

[54] LOBULAR PIN

[75] Inventor: Peter J. Ferguson, South Dartmouth, Mass.

[73] Assignee: Research Engineeering & Manufacturing, Inc., New Bedford, Mass.

[21] Appl. No.: 723,765

[22] Filed: Sep. 16, 1976

[51] Int. Cl.² .............................................. F16B 19/00
[52] U.S. Cl. ..................................... 403/14; 403/379; 403/298; 85/5 CP; 85/19
[58] Field of Search ............... 403/379, 378, 324, 383, 403/359, 334, 333, 350, 298, 14; 85/5 CP, 10 R, 19

[56] References Cited

U.S. PATENT DOCUMENTS

| | | | |
|---|---|---|---|
| 2,344,413 | 3/1944 | Richards | 85/10 R |
| 3,195,156 | 7/1965 | Phipard, Jr. | 85/47 X |
| 3,240,100 | 3/1966 | Rose | 85/19 |

FOREIGN PATENT DOCUMENTS

| | | | |
|---|---|---|---|
| 564,813 | 10/1958 | Canada | 403/298 |
| 886,263 | 6/1943 | France | 403/298 |

*Primary Examiner*—Andrew V. Kundrat
*Attorney, Agent, or Firm*—Olson, Trexler, Wolters, Bushnell & Fosse, Ltd.

[57] ABSTRACT

A pin has a pilot point of uniform width throughout 360° and a body containing a cross section of arcuate polygonal lobular configuration, also of uniform width but wider than the point. The pin may be driven into a circular hole in a member such that the lobes of the pin are elastically deformed in compression to enhance the grip between the pin and the member and with there being regions of stress relief on the member intermediate the lobes. The hole in the member may also be reshaped into a lobular form. The uniform body width approximates the minimum diameter of the hole in the member. Furthermore, the pin is of a range of lobulation sufficient to span a wide range of hole diameter tolerances.

4 Claims, 11 Drawing Figures

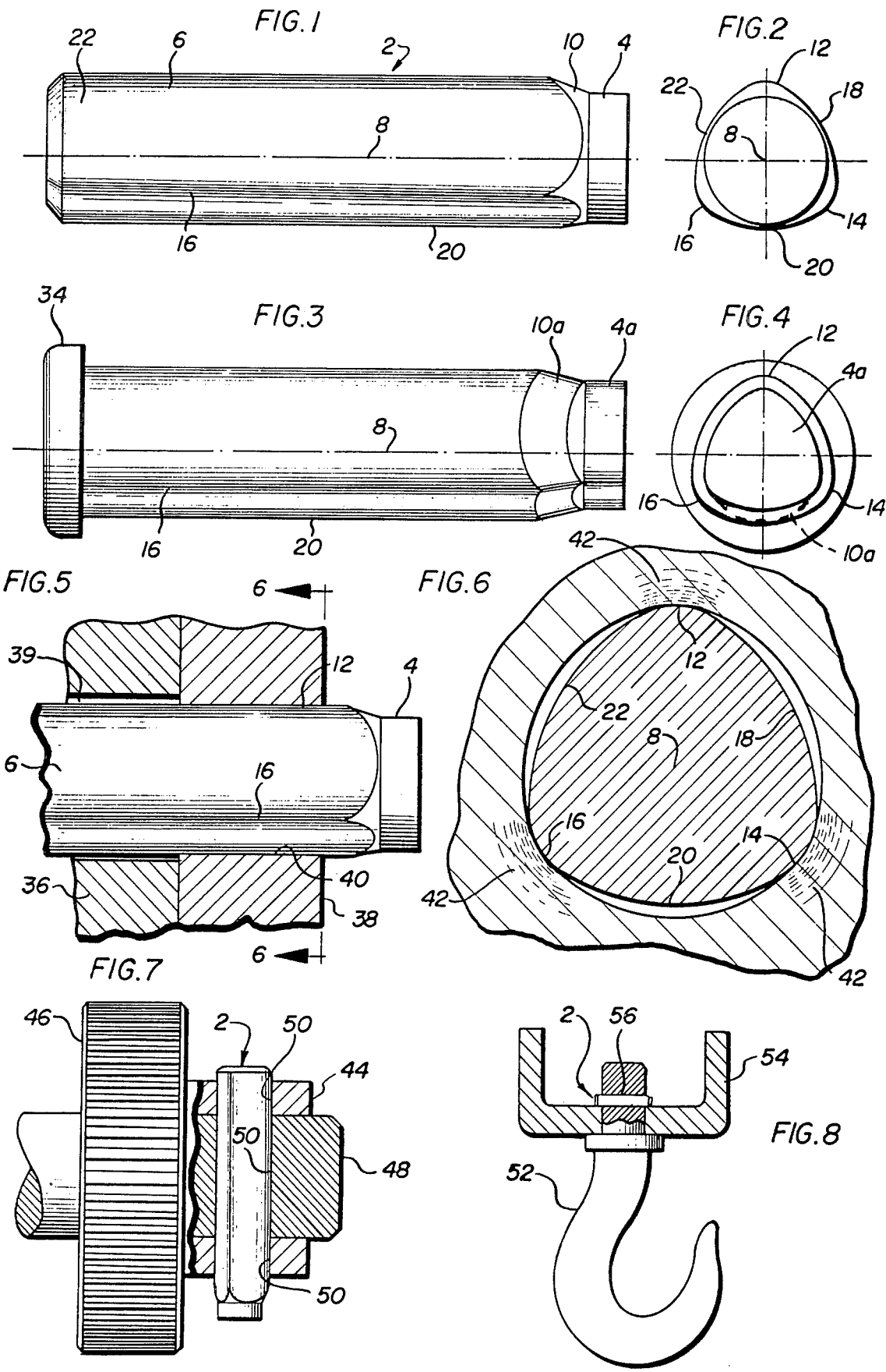

LOBULAR PIN

BACKGROUND OF THE INVENTION

This invention relates to improvements in pins of the type used in coupling mechanical parts together. Typical applications include the keying of sprockets, gears, etc. to shafts. Pins of the foregoing type are ordinarily driven into a circular hole that is formed in the mechanical member to which the pin is attached. These holes have a fairly wide range of tolerances regardless of whether or not they are drilled, punched or cored. Furthermore, the tolerance normally increases as the function of the diameter of the hole. Accordingly, spring and serrated pins of the various designs have come into widespread use in order to accommodate for these tolerances.

Ideally, there should be a close tolerance between the hole and the pin. To accomplish this it is possible to form the hole by reaming or honing and to provide a precision ground pin of circular cross section to fit therein. While structurally desirable, such an arrangement is rather expensive.

Another problem of pins with circular cross section lies in the fact that circular pins in circular holes cause a sustained "hoop" stress that sometimes leads to cracking and bursting of the material around the hole. This, of course, is highly undesirable, particularly for applications involving dynamic loading. Moreover the hoop stress is accentuated if the pin is of maximum tolerance and the hole is of minimum tolerance.

OBJECTS AND SUMMARY OF THE INVENTION

An object of this invention is to provide a pin of lobular cross section having a uniform diametral width and which approaches the performance of a precision round pin. The pin of the present invention is operable in a hole that may have a wide range of tolerances. The uniform diametral width of the pin approximates the minimum diameter of the hole of the member into which it is installed. The pin may have a selected range of lobulation so as to be fitted into holes having a wide range of tolerance.

A further object of this invention is to provide a pin of the type stated in which the stresses between the pin and the member into which it is inserted are localized at the areas of the lobes and are relieved in the areas between the lobes. The arrangement provides a satisfactory locking condition between the pin and the member and yet results in a reduction in residual hoop stress.

A still further object of this invention is to provide a pin of the type stated wherein, for the range of desired lobulation, the diametral width of the pin is very close to the diameter of that circle having an area that is equivalent to the area of the lobular section.

In accordance with the foregoing objects the pin comprises a pilot point with a uniform width throughout 360°, the pin having a longitudinal axis and a body containing a cross section of arcuate polygonal lobular configuration with an odd number of arcuate sides and intermediate circumferentially spaced arcuate lobes. The radii of the lobes are each substantially less than the radii of the arcuate sides. The cross section of the body is of uniform width throughout 360° and the body has a width which is greater than the width of the pilot point. The lobes have peaks which are equal distance from the longitudinal axis of the pin and which peaks are adaped to engage the wall of a hole to enhance the grip between the pin and the wall of the hole at regions that are essentially localized at the lobes. At least portions of the arcuate sides between the peaks of the lobes are regions of stress relief between the pin and the hole. Elastic deformation of the hole also takes place causing the hole to be reshaped into a lobular form. The extent of reshaping will vary with the tolerance of the hole and the pin.

BRIEF DESCRIPTION OF THE FIGURES

FIG. 1 is a side elevational view of a lobular pin constructed in accordance with and embodying the present invention;

FIG. 2 is a front elevational view thereof;

FIG. 3 is another form of lobular pin in accordance with the present invention;

FIG. 4 is a front elevational view of the pin of FIG. 3;

FIG. 5 is a sectional view of a pin of the type shown in FIG. 1 frictionally fitted into one member and loosely fitted into another member;

FIG. 6 is an enlarged fragmentary sectional view taken along line 6—6 of FIG. 5;

FIG. 7 is a partial sectional view showing a further use of the pin of the present invention;

FIG. 8 is a partial sectional view showing still another use of the pin of the present invention;

DETAILED DESCRIPTION

Figure 6A:
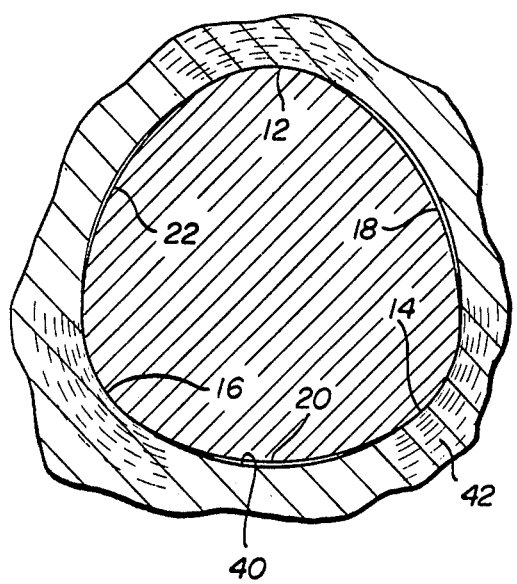
FIG. 6A (on the second sheet of drawing) is a view similar to FIG. 6 but showing the pin inserted into a minimum or near minimum diameter hole.

Referring now more particularly to FIGS. 1 and 2 there is shown a pin 2 having a pilot point 4 and a body 6 both of which are centered on a longitudinal axis 8. The point 4 is a circular cross section. The point 4 joins the body 6 through a conically tapered transitional section 10. The body 6 is of an arcuate, lobular polygonal configuration and comprises an odd number of lobes which are separated by relatively long arcuate sides. In the form of the invention herein shown there are three lobes 12,14,16 which are separated by arcuate sides 18,20,22. The radii of the lobes are substantially less than the radii of the arcuate sides as will be apparent from FIG. 2.

Figure 10:
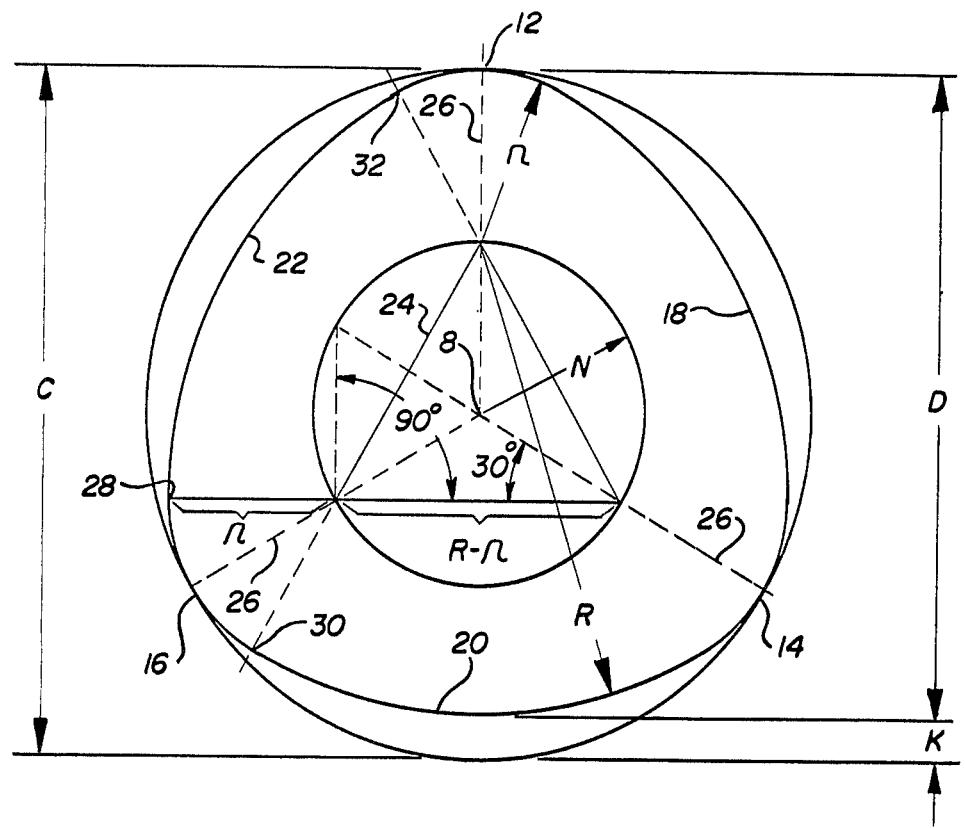
FIG. 10 is a diagrammatic view illustrating the geometry of the pin as applicable to the present invention.

The basic geometry of the lobular form or cross-section is shown in FIG. 10. Such form is generally known from U.S. Pat. to Phipard, Jr. No. 3,195,156, dated July 20, 1965. Suffice it to say that the out of round or lobulation K is the difference between C and D where C is the diameter of the cirle in which the lobular cross section is inscribed. The short radius $r$ of each lobe 12,14,16 is centered at an apex of a basic equilateral triangle having a side 24 equal to R-$r$ and inscribed in a circle centered on the axis 8 and having a radius N. The long radius R of each arcuate side 18,20,22 is at an apex that is most remote from the arc or side to which the radius R relates. Each lobe 12,14,16 extends over an arc (having radius $r$) of 60° and side 18,30,22 extends over an arc (having radius R) of 60°. The dotted lines 26 each extends through the center of the equilateral triangle, and also through an apex thereof, and the peak or center of a lobe. The points 28 and 30 designate the ends of a lobe (e.g. lobe 16) while the points 28 and 32 designate the ends of a side (e.g. side 22).

From FIG. 10 it can be derived that $R = 0.5C + N - K$. It is also known that:

$$2N = (R-r)/\cos 30° = 2N-K/\cos 30°; \text{ therefore}$$

$N = 3.732K$ and therefore,
$R = 0.5 C + 2.732K$ and
$r = 0.5C - 3.732K$

From the above formulas the values of R and r may be computed for given values of C and lobulation K. Similarly the value N may be derived with a known value of K. As will be seen hereafter, the present invention provides for a workable range of lobulation K for a unit diameter C of any pin.

It will also be apparent that the foregoing geometry provides a body 6 having a uniform width D throughout 360°. By uniform width throughout 360° it is meant that the dimension D is constant across the body along any straight line passing through the axis 8. For the circular pilot point 4, the D dimension is simply the diameter of the circle centered at 8 and shown in FIG. 2.

FIG. 3 shows a modified form of the invention in which the end of the body 6 opposite to the point 4a has an enlarged circular head 34. The tapered section 10a is of curved cross section and tapers into the lobular point 4a. This lobular point 4a, as shown in FIG. 4, contains three lobes and three arcuate sides having respectively similar geometries whereby the lobular point 4a is also of uniform width. The diameter of the circle that circumscribes the lobular point 4a might actually be equal to the D value or width of the body 6 of the pin. The diameter of the circular point 4 of FIGS. 1 and 2 approaches the diameter of the circle that is inscribed in the body section 6.

FIGS. 5 and 6 show an application of the pin of the present invention. In FIG. 5 two mechanical members 36,38 are shown coupled together. The pin fits loosely into a bore or hole 39 in the member 36 whereby the member 36 may be relatively movable with respect to the pin 2. However, the pin body 6 is force-fitted into a hole 40 in the member 38 so as to be locked therein. Referring to FIG. 6, the lobes 12,14,16 may be elastically deformed to create compression zones of stress in the member 38 indicated by the respective groups of lines 42. However, stress relief occurs in the regions between the lobes 12,14,16 namely at approximately the mid regions of the sides 18,20,22. The foregoing provides a locking condition without serious residual stresses over a wide range of tolerance over the hole 40. Some reshaping of the opening or bore 40 takes place.

In FIG. 6A there is shown a condition in which the diameter of the hole or bore 40 is at a minimum value and which is approximately the width D of the pin body 6. Consequently, the hole 40 tends to distend and be reshaped so that it is of substantially arcuate, lobular polygonal form approaching the lobular form of the pin body, yet leaving the small clearance for stress relief between the arcuate sides 18,20,22 and the bore 40.

In FIG. 7 another application of the pin 2 is shown to couple mechanical members together. Here the pin 2 is used as a cross pin to key the collar portion 44 of a gear or wheel 46 to a shaft 48. In such case the collar 44 and the shaft 48 each have aligned circular holes or bores 50,50,50 which receive the pin 2, whereby the wheel 46 is pinned to the shaft 48. As in the previously described forms, the diameter of the point 4 is approximately the same or slightly less than the diameter of each of the holes 50. Where a lobular point 4a is used it is the diameter width D which is the same as or slighly less than the diameter of the holes 50. The lobular pin body is press-fitted into one or more of the holes 50.

FIG. 8 shows a further application of the pin wherein a hook 52 is rotatably pinned to a support 54. Thus, the pin 2 is press-fitted into a cross bore 56 in the hook to retain the latter assembled with the support 54. Other applications of the pin will be apparent, the foregoing being merely illustrative by way of examples.

Figure 9:
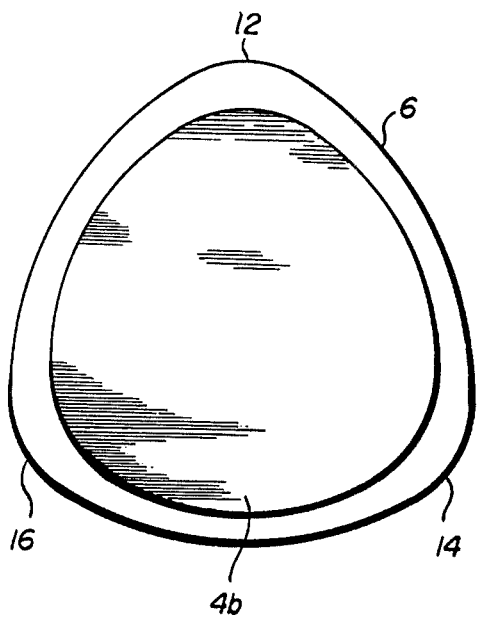
FIG. 9 is a front elevational view of a pin similar to that shown in FIG. 3 except that the point has a lesser lobulation than that of the body.

In FIG. 9 there is shown a further form of the invention in which both the body 6 and the point 4b are lobular as in FIGS. 3 and 4. However, the lobulation or K value of the point 4b is somewhat less than the lobulation of the body 6, as will be apparent from an inspection of FIG. 9. A small amount of lobulation on the point 4a as shown in FIG. 9 make it easy to insert point 4 into the circular hole in a member. The small amount of lobulation tends to make the pin point 4a self-centering.

It has been found that a lobular pin producing satisfactory results may be obtained by pins having a relatively wide range of lobulation yet which have a cross sectional area that very closely approximates the cross sectional area of a pin which is circular and has a diameter equal to the diametral width of the lobular pin. Thus, assume that Z = the diameter of a circle having an area equivalent to the lobular section, then it has been experimentally determined that Z/D may be a ratio which varies from 0.9998 to 0.98863. This range of the ratio Z/D corresponds to a lobulation (K) of 0.0095 to 0.0677 for a unit value of C. Consequently, the geometry of the lobular form can have a wide range of lobulation without sacrificing any significant amount of cross sectional area as compared to the pin of circular cross section.

The invention is claimed as follows:

1. A pin having a pilot point with a uniform width throughout 360°, said pin having a longitudinal axis and a body containing a cross section of arcuate polygonal lobular configuration with an odd number of arcuate sides and intermediate circumferentially spaced arcuate lobes, the radii of the lobes each being substantially less than the radii of said sides, said cross section being of uniform width throughout 360°, the body width being greater than the width of said pilot point, the lobes having peaks which are equal distance from a said longitudinal axis and which peaks are adapted to engage the wall of a bore to enhance the grip between the pin and the wall of the bore at regions that are essentially localized at the lobes and with at least portions of said arcuate sides between the peaks being regions of stress relief between the pin and the bore, and wherein the imaginary circle that circumscribes said peaks is centered on said axis and wherein Z is defined as the diameter of the circle having an area equal to the area of said cross section, and wherein D is defined as said body width, the ratio Z/D being within the range of 0.9998 to 0.98863.

2. A pin according to claim 1 in which the pilot point is of circular cross section.

3. A pin having a pilot point with a uniform width throughout 360°, said pin having a longitudinal axis and a body containing a cross section of arcuate polygonal lobular configuration with an odd number of arcuate sides and intermediate circumferentially spaced arcuate lobes, the radii of the lobes each being substantially less than the radii of said sides, said cross section being of uniform width throughout 360°, the body width being greater than the width of said pilot point, the lobes having peaks which are equal distance from a said longitudinal axis and which peaks are adapted to engage the wall of a bore to enhance the grip between the pin and the wall of the bore at regions that are essentially localized at the lobes and with at least portions of said arcuate sides between the peaks being regions of stress relief between the pin and the bore, and wherein the lobulation of said body is defined as the difference between the diameter of the imaginary circle that circumscribes said peaks and said body width, said lobulation being 0.0095 to 0.0677 for a unit diameter of said circle and providing a geometry of said cross section in which Z is the diameter of the circle having an area equal to the area of said cross section and D is the width of said body, the radio Z/D being within the range of 0.9998 to 0.98863.

4. A pin having a pilot point with a uniform width throughout 360°, said pin having a longitudinal axis and a body containing a cross section of arcuate polygonal lobular configuration with an odd number of arcuate sides and intermediate circumferentially spaced arcuate lobes, the radii of the lobes each being substantially less than the radii of said sides, said cross section being of uniform width throughout 360°, the body width being greater than the width of said pilot point, the lobes having peaks which are equal distance from a said longitudinal axis and which peaks are adapted to engage the wall of a bore to enhance the grip between the pin and the wall of the bore at regions that are essentially localized at the lobes and with at least portions of said arcuate sides between the peaks being regions of stress relief between the pin and the bore, and wherein the pilot point is of lobular cross section but with a lobulation that is less than the lobulation of said body.

* * * * *

UNITED STATES PATENT AND TRADEMARK OFFICE
CERTIFICATE OF CORRECTION

PATENT NO. : 4,106,877
DATED : August 15, 1978
INVENTOR(S) : Peter J. Ferguson

It is certified that error appears in the above-identified patent and that said Letters Patent are hereby corrected as shown below:

Col. 1, line 68, "adaped" should be --adapted--;

Col. 2, line 65, "30" should be --20--;

Col. 3, line 61, "clearance" should be --clearances--;

Col. 4, line 20, "make" should be --makes--;

Col. 6, line 1, "radio Z/D" should be --ratio Z/D--.

Signed and Sealed this

Sixth Day of March 1979

[SEAL]

Attest:

RUTH C. MASON
Attesting Officer

DONALD W. BANNER
Commissioner of Patents and Trademarks